United States Patent
Eise et al.

(10) Patent No.: US 8,123,202 B2
(45) Date of Patent: Feb. 28, 2012

(54) PLUNGER PISTON MADE FROM PLASTIC FOR AN AIR SPRING

(75) Inventors: Martin Eise, Schotten (DE); Jörg Assmann, Sinn (DE)

(73) Assignee: LKH-Kunststoffwerk GmbH & Co. KG, Haiger (DE)

( * ) Notice: Subject to any disclaimer, the term of this patent is extended or adjusted under 35 U.S.C. 154(b) by 637 days.

(21) Appl. No.: 11/921,803

(22) PCT Filed: Jun. 6, 2006

(86) PCT No.: PCT/EP2006/005359
§ 371 (c)(1),
(2), (4) Date: Nov. 19, 2008

(87) PCT Pub. No.: WO2006/131299
PCT Pub. Date: Dec. 14, 2006

(65) Prior Publication Data
US 2009/0160110 A1    Jun. 25, 2009

(30) Foreign Application Priority Data
Jun. 7, 2005  (DE) .................. 10 2005 026 314

(51) Int. Cl.
*F16F 9/04*  (2006.01)
(52) U.S. Cl. ................... 267/64.21; 267/64.24

(58) Field of Classification Search ..... 267/64.21–64.27
See application file for complete search history.

(56) References Cited

U.S. PATENT DOCUMENTS

| | | | | |
|---|---|---|---|---|
| 3,682,464 | A * | 8/1972 | Krejcir | 267/64.24 |
| 5,060,916 | A * | 10/1991 | Koschinat et al. | 267/64.27 |
| 5,382,006 | A * | 1/1995 | Arnold | 267/64.27 |
| 6,250,613 | B1 * | 6/2001 | Koeske et al. | 267/66 |
| 6,402,128 | B1 * | 6/2002 | Trowbridge | 267/64.21 |
| 6,527,259 | B1 * | 3/2003 | Nemeth et al. | 267/64.21 |
| 7,497,423 | B2 * | 3/2009 | Myers | 267/64.27 |
| 7,500,659 | B2 * | 3/2009 | Levy | 267/64.27 |

* cited by examiner

*Primary Examiner* — Christopher Schwartz
(74) *Attorney, Agent, or Firm* — Pauley Petersen & Erickson

(57) ABSTRACT

A plunger piston for an air spring. The air spring being active between a component which is to be cushioned by springs, in particular the vehicle frame, and a sprung component, in particular the axle carrier of a motor vehicle. The plunger piston is configured as a hollow piston which is connected to the sprung component at the lower plunger-piston end and to a pneumatic-spring bellows which can be loaded with compressed air at an upper plunger-piston head. The pneumatic-spring bellows is connected on the other side to the component which is cushioned by springs, and rolls on the outside of the plunger-piston skirt during suspension movements. The lower plunger-piston end has an open configuration and has a reinforcing element which encircles the edge region of the opening.

17 Claims, 1 Drawing Sheet

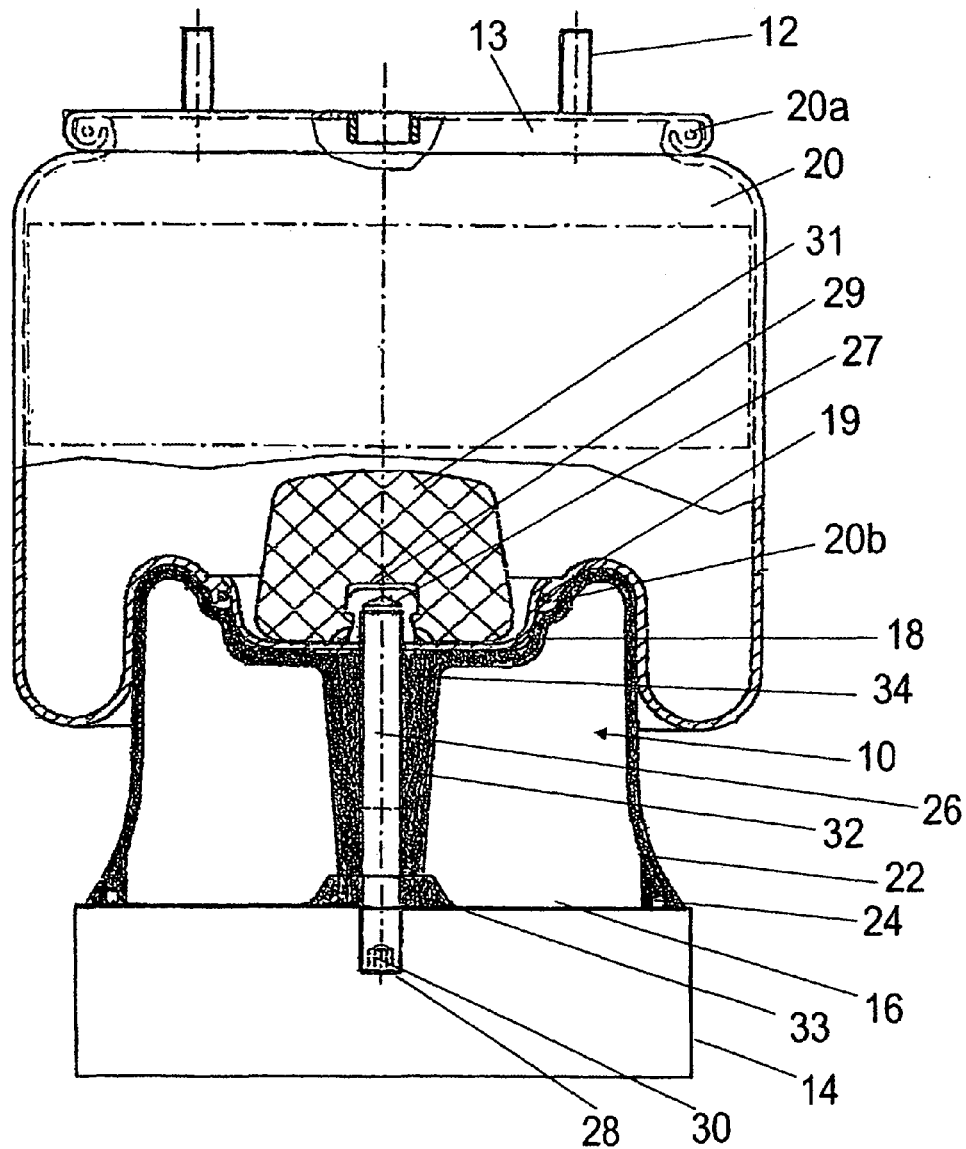

PLUNGER PISTON MADE FROM PLASTIC FOR AN AIR SPRING

BACKGROUND OF THE INVENTION

1. Field of the Invention

This invention relates to a plunger piston for a pneumatic spring, such as used with motor vehicles. A pneumatic spring acts between a component to be sprung, in particular the vehicle frame, and a resilient component, in particular the axle support of a motor vehicle. The plunger piston is a hollow body, with a plunger piston end located at a bottom and connected with the resilient component, and at a plunger piston end located at a top is connected with a pneumatic spring bellows, which can be charged with compressed air. The pneumatic spring bellows is connected with the resilient component and rolls off on an exterior of the plunger piston shell during spring movements.

2. Discussion of Related Art

Known pneumatic springs are employed in utility vehicles in particular, but also in machinery in which it is necessary to provide a spring action between two components which move in relation to each other. A spring action can be influenced by air pressure, which can be changed in the pneumatic spring bellows.

A difficulty in connection with known pneumatic springs arises because of structural conditions, or also because of restrictions in the structural space, and the plunger piston to which the lower end of the pneumatic spring bellows is attached, does not rest over its entire surface on the resilient component, for example the axle support. This results in problems regarding the functionally dependable attachment during assembly.

Because a known plunger piston is embodied as a hollow body, it is possible that unfavorable installation conditions tension problems can arise in connection with the contact of the lower, open plunger piston end with the axle support. These occur in particular in the area of the contact surface of the lower end of the plunger piston on the resilient component. As a result, deformations, or even the formation of cracks, or breaks because of shearing, can occur, so that it is no longer dependably assured that the pneumatic spring bellows correctly rolls off the exterior of the plunger piston shell during spring movements. Also, a plunger piston which can be inadvertently deformed cannot assure a sufficient transfer of forces and distribution of forces between the pneumatic spring bellows and the resilient component. Also, a satisfactory cushioning effect of the pneumatic spring is not assured.

For overcoming these difficulties it is known from German Patent References DE 197 20 776 A1 or DE 197 33 281 A1, for example in connection with a pneumatic spring, to directly provide the lower circular open end of the plunger piston facing the resilient component with a circular metal plate. The plate is fixedly connected with the plunger piston by a screw connection. This plate is used to protect the open end of the plunger piston from deformation, in particular in the plane of the plate, and simultaneously contributes to the assurance of the dimensional stability of the entire plunger piston. The plate is also used to provide a fastening option between the plunger piston and the resilient component. The plate has screws for this purpose.

The plate mounted on the plunger piston of the known pneumatic spring forms an assembly part which must be additionally attached to the plunger piston. The expense for manufacturing and materials is also thus increased in an undesired way.

SUMMARY OF THE INVENTION

It is one object of this invention to provide a plunger piston for a pneumatic spring which can be produced cost-effectively in a simple manner and still shows sufficient dimensional stability and thus provides protection against undesired deformations and the formation of cracks. Also, the plunger piston in accordance with this invention assures dependable transmission of forces and distribution of forces between the pneumatic spring bellows and the resilient component.

This object of this invention is accomplished with a plunger piston having characteristics described in this specification and in the claims.

Accordingly, the plunger piston end located on the bottom is open and has a reinforcement element running around the edge area of the opening. The reinforcement element assures sufficient dimensional stability and offers protection against undesired deformations and the formation of cracks. The subsequent mounting of an additional stiffening device, such as a plate, for example, can be omitted, so that the assembly outlay is minimized. It is also possible to save additional mounting materials, by which the material costs are reduced.

In order to keep the exterior dimensions of the plunger piston low in view of a possibly limited installation space, the reinforcement element can be arranged on the inner edge area of the opening. During this, the opening can be circular in a manner in accordance with simple manufacturing technology, and the reinforcement element can be embodied as an annular element. An annularly-shaped reinforcement element of this type offers particularly good protection against deformations.

For keeping the material and manufacturing costs low, the plunger piston can include a plastic material, at least in part, while the reinforcement element is at least partially embedded in the plastic material. For this purpose, it is possible, for example, to use a high-pressure die casting or an injection molding process as a simple method in accordance with process technology. It is thus possible to simply place the reinforcement element into the tool mold prior to injection molding or die casting, and it is encased in the plastic material during the subsequent process.

If portions of the reinforcement element are exposed and subjected to effects of the environment, the reinforcement element can include a corrosion-resistant material, in particular corrosion-resistant steel. The use of a reinforcement material made of plastic or an inorganic material, for example glass fibers, is also conceivable.

The reinforcement element can alternatively be completely surrounded by the plastic material. In that case, the reinforcement element can be made of a non-corrosion-resistant material.

To simplify the mounting of the plunger piston on the resilient component, while at the same time further improving the dimensional stability of the plunger piston, a support bolt can be arranged in the interior of the hollow plunger piston and extend from the plunger piston bottom at the top to the plunger piston end located below, wherein a screw arrangement for mounting the plunger piston on the resilient component is attached to the lower end of the support bolt.

The support bolt can be encased in a plastic material as protection against corrosion.

Because the support bolt is only introduced during the assembly, it is possible to embody a plunger piston, which is stabilized in regard to vertical deformation, because an approximately tube-shaped plastic part is arranged around the support bolt, which is connected with the plunger piston bottom at the upper end.

In a manner which is particularly simple and advantageous with respect to manufacturing technology, the plunger piston shell, the plunger piston bottom and the casing of the support bolt, or the approximately tube-shaped plastic part, can be produced in one piece of plastic material. The cost-effective injection molding process can be used for this purpose, in particular.

BRIEF DESCRIPTION OF THE DRAWING

This invention is explained in greater detail in view of a preferred embodiment, making reference to the sole drawing FIGURE which represents a pneumatic spring having a plunger piston in accordance with this invention, in a sectional lateral view.

DETAILED DESCRIPTION OF THE INVENTION

The represented pneumatic spring is arranged between a vehicle frame 12, not shown in greater detail, and an axle support 14, not represented in greater detail, of a utility vehicle. The pneumatic spring has a pneumatic spring bellows 20, which can be charged with compressed air and is connected at its upper edge 20a with a vehicle frame 12. For this purpose, the upper edge of the pneumatic spring bellows 20 is sealingly attached to a spring plate 13, which in turn is screwed to the vehicle frame 12.

At its lower edge, the pneumatic spring bellows 20 is sealingly clamped between the plunger piston bottom 18 at the top of the plunger piston 10 and a fastening plate 19. During spring movements, the pneumatic spring bellows 20 rolls off the exterior of the plunger piston shell 22. A support bolt 26 is arranged in the interior of the plunger piston 10, which is connected at its upper end 27 with the fastening plate 19 by a screw 29, and at its lower end 28 with the axle support 14 by a screw connection 30. The screw 29 supports a buffer 31, against which the spring plate 13 of the pneumatic spring bellows 20 comes to rest at the maximum spring deflection of the pneumatic spring.

The plunger piston 10 is made of a plastic material in an injection molding process and is designed as a hollow body with a circular opening at the plunger piston end 16 located at the bottom. An annular-shaped reinforcement element 24, made of steel, is applied and runs around the edge area of the opening. During manufacture, the reinforcement element 24 is placed into the injection mold prior to injection molding and is cast during the subsequent injection molding process, so that the reinforcement element 24 is completely surrounded by the plastic material.

An approximately tube-shaped plastic part 32 is arranged around the support bolt 26 and is connected at the upper end with the plunger piston bottom 18. The plastic part 32 tapers in the shape of a cone in the direction toward its upper end 34. At is lower end, the plastic part 32 forms a widened contact area 33 for the axle support 14. During assembly, the support bolt is passed through the approximately tube-shaped plastic part 32 and is screwed together on one side with the fastening plate 19 and on the other side with the axle support 14.

The plunger piston shell 22, the plunger piston bottom 18 and the approximately tube-shaped plastic part 22 are produced in one piece of plastic material by an injection molding process. It is advantageously possible to form reinforcement elements, for example reinforcing ribs, on the interior enclosed by the plunger piston 10. For reasons of removal from the mold, the reinforcement elements are embodied without an undercut toward the open end of the plunger piston 10. For example, the reinforcement elements can connect the inside of the plunger piston shell 22 with the plunger piston bottom and/or with the plastic part 32.

The invention claimed is:

1. A plunger piston (10) for a pneumatic spring, which acts between a resilient component (12) to be sprung and a second resilient component (14), wherein a plunger piston has a hollow body, a plunger piston end (16) is located at a bottom connected with the resilient component (14), and at a second plunger piston end (18) located at the top is connected with a pneumatic spring bellows (20) which can be charged with a compressed air, which is connected with the resilient component (12) and rolls off on an exterior of the plunger piston shell (22) during spring movements, the plunger piston comprising:

the plunger piston end (16) located on a bottom which is open and has a reinforcement element (24) running around an edge area of the opening, the plunger piston (10) manufactured, at least in part, of a plastic material, and the reinforcement element (24) at least partially embedded in the plastic material by an injection molding process;

a support bolt (26) arranged in an interior of the hollow plunger piston (10), the support bolt (26) extends from the second plunger piston bottom (18) at the top to the plunger piston end (16) located below, and a screw arrangement (30) for mounting the plunger piston (10) on the resilient component (14) is attached to the lower end (28) of the support bolt (26); and a tube-shaped plastic part (32) arranged around the support bolt (26) which is connected at an upper end (34) with the second plunger piston bottom (18), wherein the tube-shaped plastic part (32) tapers in a shape of a cone from the upper end (34) and forms a widen contact area (33) at a lower end for the second resilient component (14).

2. The plunger piston in accordance with claim 1, wherein the reinforcement element (24) is arranged on an inner edge area of the opening.

3. The plunger piston in accordance with claim 2, wherein the opening is circular, and the reinforcement element (24) is an annular element.

4. The plunger piston in accordance with claim 3, wherein the reinforcement element (24) is of a corrosion-resistant material, such as a corrosion-resistant steel.

5. The plunger piston in accordance with claim 4, wherein the reinforcement element (24) is completely surrounded by the plastic material.

6. The plunger piston in accordance with claim 3, wherein the reinforcement element (24) is of a non-corrosion-resistant material.

7. The plunger piston in accordance with claim 6, wherein the support bolt (26) is encased in a plastic material.

8. The plunger piston in accordance with claim 7, wherein the plunger piston shell (22), the second plunger piston bottom (18) and a casing of one of the support bolt and the approximately tube-shaped plastic part (32) is produced in one piece of plastic material by an injection molding process.

9. A plunger piston according to claim 8, wherein a pneumatic spring has the plunger piston (10).

10. The plunger piston in accordance with claim 7, wherein the plunger piston shell (22), the second plunger piston bottom (18) and a casing of one of the support bolt and the approximately tube-shaped plastic part (32) is produced in one piece of plastic material by an injection molding process.

11. The plunger piston in accordance with claim 1, wherein the opening is circular, and the reinforcement element (24) is an annular element.

12. The plunger piston in accordance with claim 1, wherein the reinforcement element (24) is of a corrosion-resistant material, such as a corrosion-resistant steel.

13. The plunger piston in accordance with claim 1, wherein the reinforcement element (24) is completely surrounded by the plastic material.

14. The plunger piston in accordance with claim 1, wherein the reinforcement element (24) is of a non-corrosion-resistant material.

15. The plunger piston in accordance with claim 1, wherein the support bolt (26) is encased in a plastic material.

16. A plunger piston according to claim 1, wherein a pneumatic spring has the plunger piston (10).

17. A plunger piston according to claim 1, wherein the resilient component (12) is a vehicle frame and the second resilient component (14), is an axle support of a motor vehicle.

\* \* \* \* \*